(12) United States Patent
Herbert et al.

(10) Patent No.: US 10,830,190 B2
(45) Date of Patent: Nov. 10, 2020

(54) PRESSURE MEASUREMENT APPARATUS FOR AN ENGINE

(71) Applicant: Ford Global Technologies, LLC, Dearborn, MI (US)

(72) Inventors: Jack Herbert, Chelmsford (GB); Ian Halleron, Chelmsford (GB); Jon Dixon, Maldon (GB); Scott Bell, Basildon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 15/805,596

(22) Filed: Nov. 7, 2017

(65) Prior Publication Data

US 2018/0135570 A1    May 17, 2018

(30) Foreign Application Priority Data

Nov. 14, 2016   (GB) .................................. 1619212.2

(51) Int. Cl.

| | |
|---|---|
| *F02M 26/47* | (2016.01) |
| *F02M 35/10* | (2006.01) |
| *F02M 26/61* | (2016.01) |
| *G01F 1/36* | (2006.01) |

(Continued)

(52) U.S. Cl.
CPC ............ *F02M 26/47* (2016.02); *F01N 11/002* (2013.01); *F02M 26/61* (2016.02); *F02M 26/73* (2016.02); *F02M 35/1038* (2013.01); *G01F 1/36* (2013.01)

(58) Field of Classification Search
CPC ........ F02M 26/47; F02M 26/61; F02M 26/73; F02M 35/1038; F02M 26/23; F02M 2700/4392; G01F 1/36; F01N 11/002
See application file for complete search history.

(56) References Cited

U.S. PATENT DOCUMENTS

| 5,613,479 A | 3/1997 | Gates et al. |
|---|---|---|
| 6,415,777 B1 | 7/2002 | Gagnon |

(Continued)

FOREIGN PATENT DOCUMENTS

| CN | 205135853 U | 4/2016 |
|---|---|---|
| CN | 205559110 U | 9/2016 |

(Continued)

OTHER PUBLICATIONS

Intellectual Property Office of the United Kingdom, Combined Search and Examination Report Issued in Application No. GB1619212.2, dated Apr. 25, 2017, South Wales, 8 pages.

(Continued)

*Primary Examiner* — Xiao En Mo
(74) *Attorney, Agent, or Firm* — Geoffrey Brumbaugh; McCoy Russell LLP

(57) ABSTRACT

A pressure measurement apparatus for an engine is provided. The pressure measurement apparatus includes a gas flow path component of one of an intake system or an exhaust system, and a differential pressure sensor having a sensor body defining first and second pressure ports, wherein the sensor body is configured to cooperate with an opening in a wall of the gas flow path component so that at least one of the first and second pressure ports terminates inside the gas flow path component in an assembled configuration.

11 Claims, 3 Drawing Sheets

(51) Int. Cl.
*F02M 26/73* (2016.01)
*F01N 11/00* (2006.01)

(56) References Cited

U.S. PATENT DOCUMENTS

| | | | | |
|---|---|---|---|---|
| 6,502,564 | B1* | 1/2003 | Gagnon | F02M 26/57 |
| | | | | 123/568.27 |
| 6,810,725 | B2* | 11/2004 | Henderson | G01F 1/44 |
| | | | | 73/114.74 |
| 2004/0168508 | A1* | 9/2004 | Henderson | G01F 1/44 |
| | | | | 73/114.76 |
| 2009/0084193 | A1 | 4/2009 | Cerabone et al. | |
| 2013/0080034 | A1* | 3/2013 | Chi | F02D 41/0065 |
| | | | | 701/108 |
| 2013/0167811 | A1* | 7/2013 | Leustek | F02M 26/47 |
| | | | | 123/568.11 |
| 2015/0059713 | A1* | 3/2015 | Forshier | G01F 1/44 |
| | | | | 123/568.11 |

FOREIGN PATENT DOCUMENTS

| | | |
|---|---|---|
| DE | 102015008359 A1 | 12/2016 |
| EP | 2843225 A1 | 3/2015 |

OTHER PUBLICATIONS

European Patent Office, Extended European Search Report Issued in Application No. 17201725.3, dated Feb. 13, 2018, Germany, 8 pages.

* cited by examiner

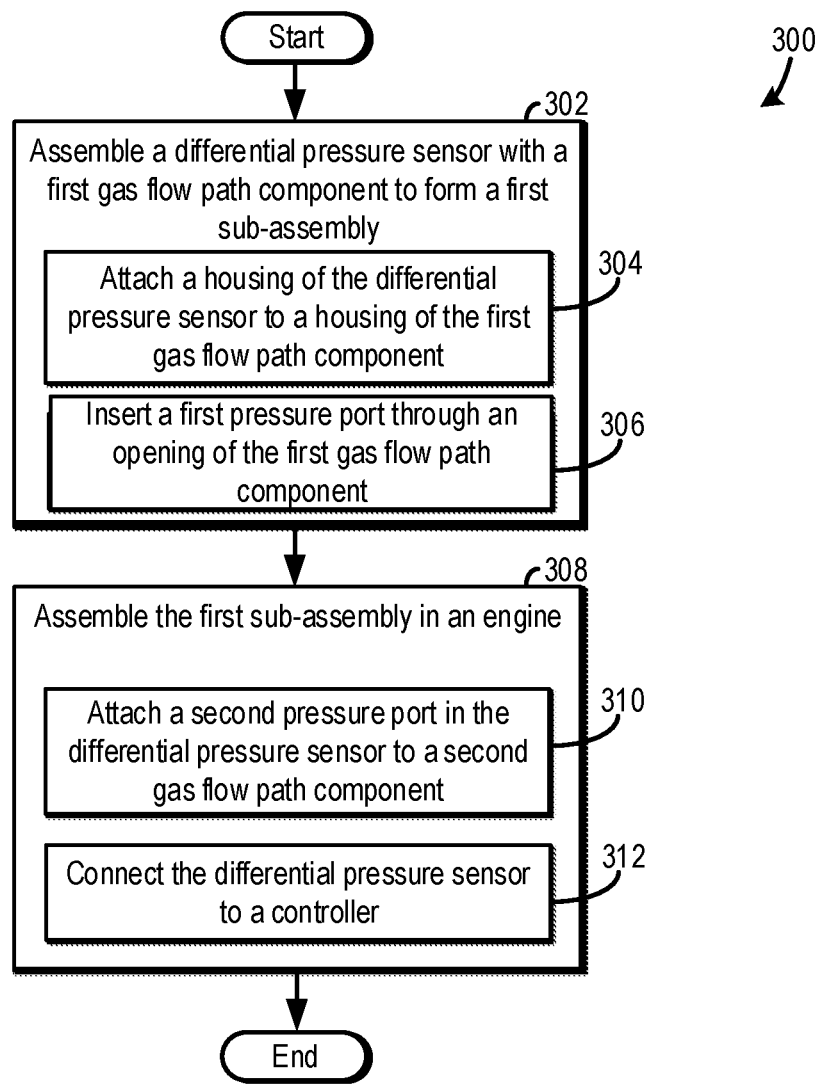

PRESSURE MEASUREMENT APPARATUS FOR AN ENGINE

CROSS REFERENCE TO RELATED APPLICATION

The present application claims priority to United Kingdom Application No. 1619212.2, filed on Nov. 14, 2016. The entire contents of the above-referenced application are hereby incorporated by reference in its entirety for all purposes.

FIELD

This disclosure relates to pressure measurement apparatus for an engine, and in particular, but not exclusively, relates to an arrangement of a differential pressure sensor and a gas flow path component of an intake system or an exhaust system.

BACKGROUND/SUMMARY

It is common for an exhaust gas recirculation (EGR) system of a vehicle to be fitted with a sensor to measure pressure changes across an EGR valve. For example, when exhaust gas flows through the EGR valve, a differential pressure sensor is able to measure the pressure difference across the valve, from which the mass flow rate of exhaust gas flowing through the EGR system can be determined.

It is beneficial to ensure that a desired amount of exhaust gas is flowing through the EGR system to help reduce harmful emissions, to comply with emissions standards in support of a clean environment, and to improve the reliability of the engine.

It is known to mount a differential pressure sensor of an EGR system close to an EGR valve using a bracket. The differential pressure sensor may then be fitted with two pipes, one of which is attached to one side of the EGR valve, e.g., to an air intake path of the engine, and the other being attached to the other side of the EGR valve, e.g., to an exhaust gas flow path of the engine. Attaching the differential pressure sensor in this manner can introduce unnecessary cost and additional weight due to the required brackets, connecting pipes, and clips, etc., and also provides an opportunity for the incorrect connection of pipes and damage to the connecting pipes.

It is against this background that the present invention has arisen. To solve at least some of the aforementioned problems the inventors have provided a pressure measurement apparatus for an engine. The pressure measurement apparatus includes a gas flow path component of one of an intake system or an exhaust system, and a differential pressure sensor having a sensor body defining a first and second pressure ports, wherein the sensor body is configured to cooperate with an opening in a wall of the gas flow path component so that at least one of the first and second pressure ports terminates inside the gas flow path component in an assembled configuration. For example, at least one of the first and second pressure ports may terminate in a gas flow path through the gas flow path component in an assembled configuration. Designing a pressure measurement apparatus with the first pressure port extending though the opening in the gas flow path component, such as an EGR valve, and terminating inside the gas flow path component, eliminates the need for a separate connector between the pressure sensor and the gas flow path component, if desired. As a result, the compactness of the engine is increased and the assembly process of the engine is simplified, thereby reducing manufacturing costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a method for manufacturing an engine with a pressure measurement system.

FIGS. 1 and 2 are shown approximately to scale. However, other relative dimensions may be used in other embodiments.

DETAILED DESCRIPTION

Figure 1:
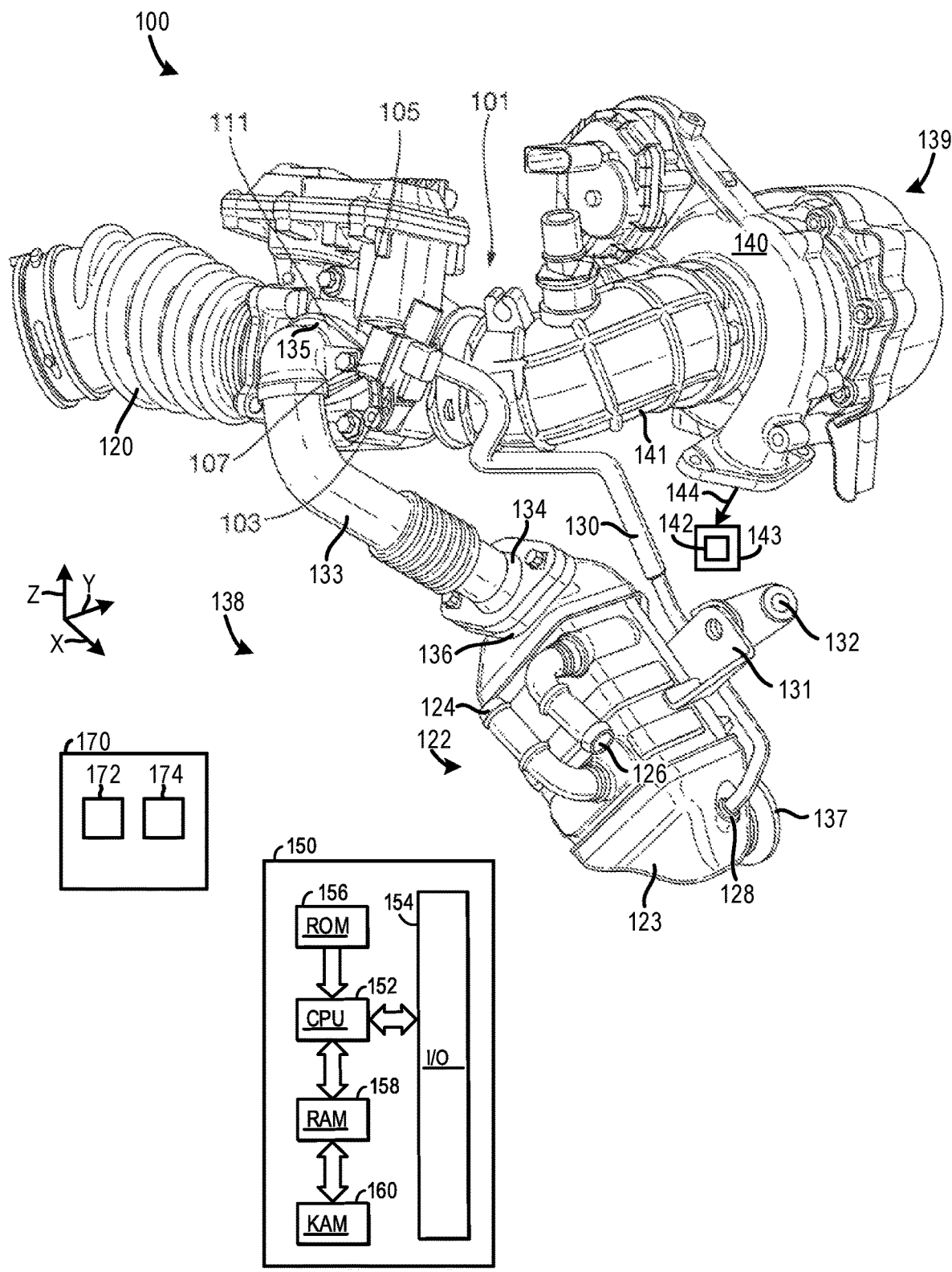
FIG. 1 shows a portion of an exhaust gas recirculation system of an engine.

An engine for a vehicle can be fitted with an intake system and/or an exhaust system that each typically include several different components configured to control and/or direct the flow of gas towards and/or away from the engine. Further, it is common to use a differential pressure sensor to measure the difference in operating pressures between two different portions of the intake system or the exhaust system. For example, a differential pressure sensor may be used to measure the pressure difference across an exhaust gas recirculation valve or the pressure difference across a particulate filter of the exhaust system. It is understood, therefore, that a differential pressure sensor may be installed across any appropriate portion of the intake system or the exhaust system, depending on the desired location of pressure measurement.

In order to mount the differential pressure sensor in a convenient position to take a pressure measurement, the differential pressure sensor is usually attached to a bracket, which can be secured to an appropriate portion of the engine or vehicle. Each pressure port of the differential pressure sensor can then be connected, for example using a tube or duct, to a desired portion of the intake system or the exhaust system. The description provides pressure measurement apparatus which simplifies the installation of the differential pressure sensor, which can reduce cost and weight of an engine and/or vehicle, and can increase the ease of manufacture/assembly of the engine or vehicle.

The sensor body may be configured to sealably engage the opening in the wall of the gas flow path component. For example, at least one of the first pressure port, the second pressure port, and the gas flow path component may include a seal configured to seal the opening when the sensor body engages the opening.

The sensor body may be configured to mount directly onto the gas flow path component. The sensor body and the gas flow path component may each include corresponding mounting features that allow the sensor body to mount directly onto the gas flow path component. The differential pressure sensor may be securable to the gas flow path component by virtue of the interaction between the at least one of the first and second pressure ports and the opening in the wall of the gas flow path component.

The sensor body may extend at least partially through the opening in the wall of the gas flow path component. The sensor body may be in direct fluidic communication with the gas flow though the gas flow path component, for example without the use of one or more intermediary connectors, such as a tube or duct.

The sensor body may include a first pressure port that terminates inside the gas flow path component. The sensor body may include a second pressure port that terminates outside of the gas flow path component. The pressure measurement system may include a duct configured to connect one of the pressure ports, for example the second pressure port, to another portion of the intake system or the exhaust system.

The gas flow path component may be an air flow path component. For example, the gas flow path component may be a component configured to flow air between one portion of the intake system or the exhaust system and another portion of the intake system or the exhaust system. The gas flow path component may be a valve assembly of the intake system or the exhaust system. The gas flow path component may be a control valve of an exhaust gas recirculation loop, in one example.

The pressure measurement apparatus may include a controller configured to determine the pressure differential across the first and second pressure ports of the differential pressure sensor.

According to another aspect of the present disclosure there is provided a differential pressure sensor for an intake system or an exhaust system of an engine, the differential pressure sensor having a sensor body including a first pressure port and a second pressure port, wherein the sensor body is configured to engage with an opening in a wall of a gas flow path component, so that at least one of the first and second pressure ports terminates inside the gas flow path component.

According to another aspect of the present disclosure there is provided a gas flow path component of an intake system or an exhaust system for an engine, the gas flow path component having a portion with an opening configured to receive a sensor body of a differential pressure sensor, so that at least one of a first and second pressure port of the differential pressure sensor terminates inside the gas flow path component.

According to another aspect of the present disclosure there is provided an exhaust gas recirculation system for a vehicle, the exhaust gas recirculation system includes an exhaust gas recirculation valve, and a differential pressure sensor, wherein a sensor body of the differential pressure sensor is in direct fluidic communication with a gas flow path of the exhaust gas recirculation valve.

An engine or a vehicle may be provided that includes at least one of the above-mentioned pressure measurement apparatus, the differential pressure sensor, the gas flow path component, and the exhaust gas recirculation system, in one example.

One advantage of the pressure measurement system described herein is that the first pressure port extends though the opening in a gas flow path component, such as an EGR valve, and terminates inside the gas flow path component, which may eliminate the need for a separate connector between the pressure sensor and the gas flow path component, if desired. Importantly, when the differential pressure sensor is assembled with the gas flow path component, the second pressure port terminates outside of the gas flow path component so that it may be connected to another portion of the gas flow system to allow for a differential pressure measurement across different portions of the gas flow system. Since no additional bracketry is needed to mount the differential pressure sensor, if desired, the pressure measurement system is beneficial because the overall number of components assembled in the engine/vehicle needed to take differential pressure measurements may be reduced.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

Figure 2:
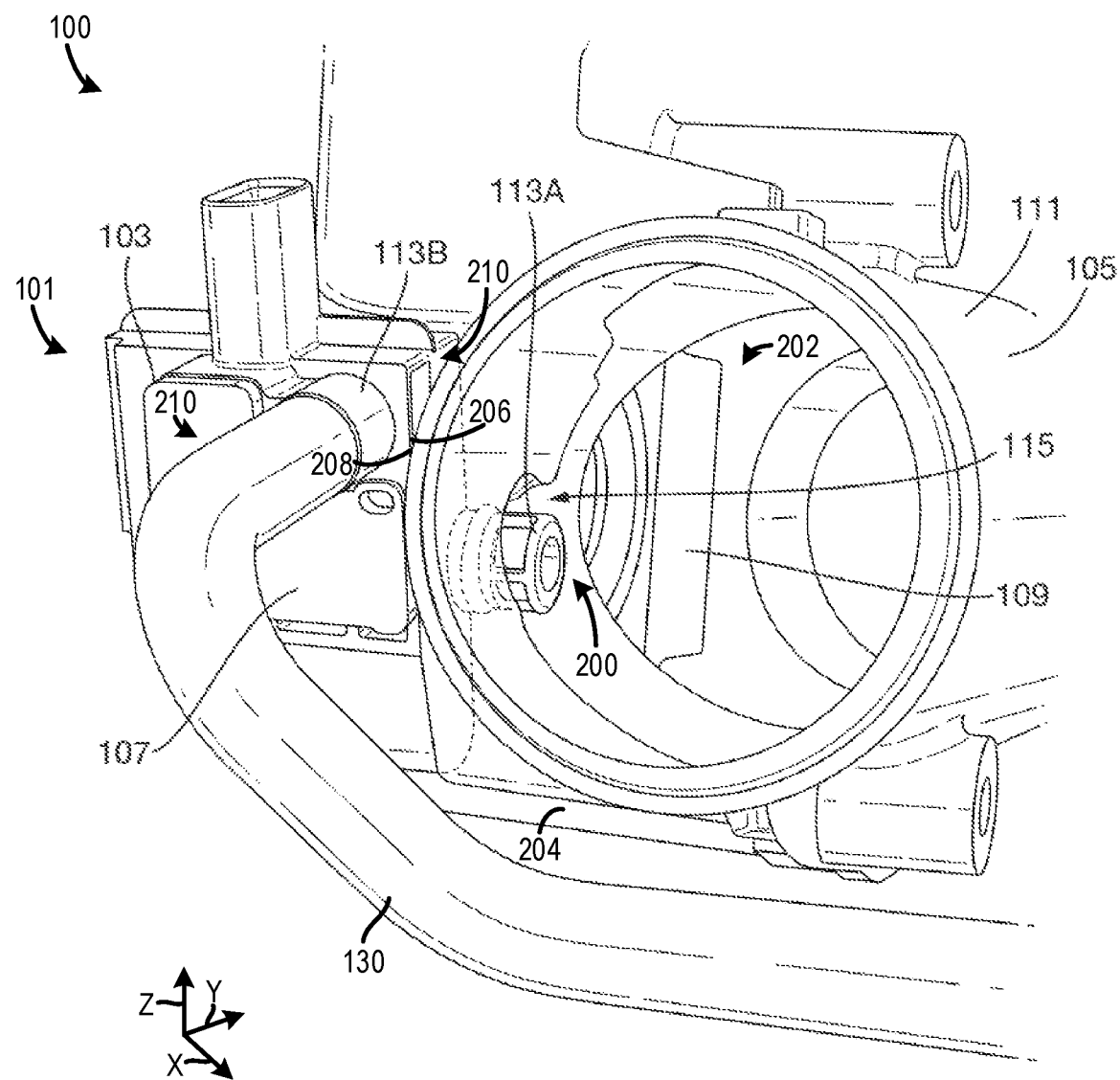
FIG. 2 shows a detailed view of a differential pressure sensor installed in the exhaust gas recirculation system.

FIGS. 1 and 2 show a pressure measurement system 100. The pressure measurement system 100 includes a pressure measurement apparatus 101 including a differential pressure sensor 103 and a component 105 of a gas flow system, for example a component of an intake system or an exhaust system. The component 105 may therefore be a gas flow path component, in one example. The differential pressure sensor 103 is mounted directly to the said component 105 such that a sensor body 107 of the differential pressure sensor 103 extends through the said component 105 and into the gas flow path 109. In FIGS. 1 and 2, the said component 105 is a low pressure Exhaust Gas Recirculation (EGR) valve 111. However, the said component 105 may be any appropriate portion of the intake system or the exhaust system, in other examples.

The differential pressure sensor 103 includes a first pressure port 113A and a second pressure port 113B. As shown in FIG. 2, the first pressure port 113A is configured to cooperate with an opening 115 in a wall of the EGR valve 111. In this manner, the first pressure port 113A extends though the opening 115 and terminates inside the EGR valve 111, which eliminates the need for a separate connector between the first pressure port 113A and the EGR valve 111, if desired. When the differential pressure sensor 103 is assembled with the EGR valve 111, the second pressure port 113B terminates outside of EGR valve 111 so that it may be connected to another portion of the gas flow system to allow for a differential pressure measurement. Since no additional bracketry is required to mount the differential pressure sensor 103, the present pressure measurement system is beneficial as it reduces the overall number of components assembled to the engine/vehicle in order to take differential pressure measurements, if desired.

In one arrangement, the sensor body 107 of the differential pressure sensor 103 may be configured to sealably engage with the opening 115. Further, the engagement between the first pressure port 113A and the opening 115 may secure the differential pressure sensor 103 in position on the EGR valve 111. For example, the fit between the first pressure port 113A and the opening may be an interference fit configured to hold the differential pressure sensor 103 in place when the first pressure port 113A is inserted into the opening 115. Additionally or alternatively, the differential pressure sensor 103 and/or the EGR valve 111 may include one or more features, such as a clip or a snap fixing, configured to secure the differential pressure sensor 103 to the EGR valve 111. In one arrangement, the sensor body 107 of the differential pressure sensor 103 may be specially shaped so as to match the exterior form of the EGR valve 111, which may help reduce the packaging requirements of the vehicle and/or help secure the differential pressure sensor 103 to the EGR valve 111.

In the arrangement shown in FIGS. 1 and 2, the sensor body 107 is directly mounted to the outside wall of the EGR valve 111. In particular, the sensor body 107 is mounted directly over the opening 115 such that the first pressure port 113A extends directly through the wall of the EGR valve 111 and into the gas flow path 109. In one or more other arrangements, the sensor body 107 may be positioned remote from the opening 115, for example on a component next to or near to the EGR valve 111, and the first pressure port 113 may extend along an at least partially bent and/or curved path to allow the first pressure port 113A to extend directly through the wall of the EGR valve 111 without the need for one or more intermediary connectors, if desired.

One advantage of the pressure measurement system 100 described herein is that the system can be supplied as a subassembly, which can be installed directly to the engine or the vehicle. For example, where the pressure measurement system 100 includes the EGR valve 111, an EGR valve manufacturer can supply the EGR valve 111 with the differential pressure sensor 103 pre-assembled to the EGR valve 111. In this manner, an engine and/or vehicle manufacturer need not fix the differential pressure sensor 103 to the vehicle, if desired, and need only connect the second pressure port 113B of the differential pressure sensor 103 to another gas flow path component, which reduces the time and cost associated with manufacturing the engine and/or vehicle.

FIG. 1 additionally illustrates an intake duct 120. The intake duct 120 may receive air from upstream intake system components, such as an air filter. The intake duct 120 is coupled to the EGR valve 111.

FIG. 1 also shows an EGR cooler 122. The EGR cooler 122 is designed to reduce the temperature of the EGR gas flowing therethrough. For instance, the EGR cooler 122 may include coolant conduits extending through a housing 123. Thus, the EGR cooler 122 includes a coolant inlet 124 and a coolant outlet 126 enabling coolant to be circulated through the cooler. Heat from the EGR cooler 122 may be directed to a heat exchanger (e.g., radiator) in an engine cooling system, in one example, via the coolant outlet 126. In such an example, the coolant inlet 124 may receive coolant from a coolant pump in the engine cooling system. The EGR cooler 122 also includes a port 128 connected to the second pressure port 113B via a conduit 130. The EGR cooler 122 further includes a mounting flange 131 with an opening 132 designed to enable the cooler to attached to selected engine components.

The EGR cooler 122 is connected to the EGR valve 111 via an EGR conduit 133 having an inlet 134 and an outlet 135. As shown, the inlet of the EGR conduit 133 is coupled to an outlet 136 of the EGR cooler 122. The EGR cooler 122 also includes an inlet 137 receiving exhaust gas from upstream components such as an EGR conduit and the exhaust system. It will also be appreciated that the EGR cooler 122, EGR conduit 133, and the EGR valve 111 may be included in an EGR system 138.

A turbocharger 139 is also shown in FIG. 1. The turbocharger includes a compressor 140 receiving intake air from an intake conduit 141 coupled to the EGR valve 111 and receiving gas flow therefrom. The compressor 140 may be driven via a turbine receiving exhaust gas flow or may be driven by rotational input from a crankshaft. The compressor 140 may be designed to increase the airflow provided to a cylinder 142 in an engine 143. In this way, the compressor can provide boost to the engine to increase combustion efficiency. The fluidic connection between the compressor 140 and the engine 143 is illustrated via an arrow 144. However, it will be appreciated that various conventional components may be used to fluidically connect the compressor 140 to the engine 143 such as intake conduits, an intake manifold, a throttle, etc. However in other examples, the turbocharger may be omitted from the engine 143. It will be appreciated that the engine 143 includes other conventional components that enable combustion operation (e.g., a four stroke combustion cycle) to be carried out therein such as intake valves, exhaust valves, a fuel delivery system, etc.

FIG. 1 also shows a controller 150. The controller 150 may be configured to command adjustment of various components in the engine 143 and the pressure measurement system 100. For instance, the controller 150 may send control commands to the EGR valve 111 and the EGR cooler 122. The controller 150 is shown FIG. 1 as a microcomputer, including microprocessor unit 152, input/output ports 154, an electronic storage medium for executable programs and calibration values shown as a read-only memory chip 156 in this particular example, random access memory 158, keep alive memory 160, and a data bus.

Storage medium read-only memory 156 can be programmed with computer readable data representing instructions executable by processor 152. Additionally, the controller 150 may receive input signals from sensors such as the differential pressure sensor 103. The controller 150 may also send control commands to components such as the EGR cooler 122 and the EGR valve 111, as discussed above. For instance, the controller 150 may send a command to an actuator in the EGR valve that adjust the position of the EGR valve.

FIG. 1 also shows a tooling apparatus 170 including memory 172 (e.g., non-transitory memory) executable by a processor 174. The tooling apparatus 170 may be used to implement at least a portion of the manufacturing method described herein. The tooling apparatus 170 may include arms, carriages, and other component for manipulating and assembling the components in the pressure measurement system and engine.

Referring again to FIG. 2 which shows an end 200 of the first pressure port 113A openings into an internal section 202 of the EGR valve 111. The internal section 202 of the EGR valve 111 may be positioned upstream of a flow adjustment mechanism (e.g., flow adjustment plate). The EGR valve 111 also includes a housing 204 defining a boundary of the internal section 202. The housing 204 may also define the boundary of other internal flow sections within the EGR valve 111. FIG. 2 also shows the conduit 130 extending from the second pressure port 113B. Additionally, the differential pressure sensor 103 includes a housing surface 206 in face sharing contact with an outer surface 208 of the EGR valve 111, enabling the sensor to be compactly arranged in the pressure measurement system 100. Additionally, FIG. 2 shows the first pressure port 113A and the second pressure port 113B positioned on different sides of the differential pressure sensor. Specifically, in the depicted example, the first pressure port 113A and the second pressure port 113B are positioned on sides 210 of the differential pressure sensor 103 that are perpendicular to one another. However, other orientations of the pressure ports have been contemplated. Furthermore, axes X, Y, and Z are provided in FIGS. 1 and 2 for reference. As shown, the axes X, Y, and Z are perpendicular to one another.

FIG. 3 shows a method 300 for manufacturing a pressure measurement system in an engine. The method may be used to manufacture the pressure measurement system and engine described above with regard to FIGS. 1 and 2, in one example. However, it will be appreciated that the method 300 may be used to manufacture other suitable pressure measurement systems and engines, in other examples. Additionally it will be appreciated that the method may be implemented by one or more tooling apparatuses with instructions stored in non-transitory memory executable by a processor.

At 302 the method includes assembling a differential pressure sensor with a gas flow path component to form a first sub-assembly. Step 302 may include steps 304-306. At 304 the method includes attaching a housing of the differential pressure sensor to a housing of the first gas flow path component. For instance, the differential pressure sensor may be bolted, bonded, and/or otherwise attached to a housing of a valve such as an EGR valve. Step 306 includes inserting a first pressure port through an opening of the first gas flow path component. For instance, the first pressure port may be positioned in an opening extending into an internal chamber in an EGR valve.

At 308 the method includes assembling the first sub-assembly in an engine. Assembling the first sub-assembly in the engine may include step 310. At step 310 the method includes attaching a second pressure port in the differential pressure sensor to a second gas flow path component. In one example, openings in an EGR conduit and/or EGR cooler enable the second pressure port to be placed within an EGR gas flow. For instance, a conduit may be connected to both the second pressure port and a port in an EGR conduit or cooler. At 312 the method includes connecting the differential pressure sensor to a controller. For instance, the differential pressure sensor may be electrically coupled (e.g., wired and/or wirelessly coupled) to a controller to enable signals from the differential pressure sensor to be transferred to the controller during engine operation.

Method 300 enables the pressure measurement system to be supplied as a subassembly, which can be installed directly in the engine or the vehicle. For example, where the pressure measurement system includes the EGR valve, an EGR valve manufacturer can supply the EGR valve with the differential pressure sensor pre-assembled with the EGR valve. In this manner, an engine or vehicle manufacturer need not fix the differential pressure sensor to the engine or vehicle, if desired, and need only connect the second pressure port of the differential pressure sensor to another gas flow path component, which reduces the time and cost associated with manufacturing the engine/vehicle, for example. Therefore, method 300 has the technical effect of increasing manufacturing efficiency of the engine and pressure measurement system.

FIGS. 1 and 2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a pressure measurement apparatus for an engine, the pressure measurement apparatus is provided. The pressure measurement apparatus includes a first gas flow path component of one of an intake system or an exhaust system, a differential pressure sensor having a sensor body defining a first pressure port and a second pressure port, wherein the sensor body is configured to cooperate with an opening in a wall of the first gas flow path component so that at least one of the first and second pressure ports terminates inside the first gas flow path component in an assembled configuration, and a duct configured to connect one of the first and second pressure ports to a second gas flow path component of the intake system or the exhaust system, wherein one of the first and second pressure ports terminates outside of the first gas flow path component.

In another aspect, a differential pressure sensor for an intake system or an exhaust system of an engine is provided. The differential pressure sensor includes a sensor body including a first pressure port and a second pressure port, wherein at least one of the first and second pressure ports is configured to engage with an opening in a wall of a gas flow path component of the intake system or the exhaust system so that at least one of the first and second pressure ports terminates inside the gas flow path component.

In another aspect, a method for manufacturing a pressure measurement system in an engine is provided. The method includes assembling a differential pressure sensor with a first gas flow path component to form a first sub-assembly and assembling the first sub-assembly with an engine.

In another aspect, a gas flow path component of an intake system or an exhaust system for an engine is provided. The gas flow path component includes an opening configured to receive a portion of a sensor body of a differential pressure sensor so that at least one of a first and second pressure port of the differential pressure sensor terminates inside the gas flow path component.

In any of the aspects or combinations of the aspects, the sensor body may be configured to mount directly onto the first gas flow path component.

In any of the aspects or combinations of the aspects, the sensor body may extend at least partially through the opening in the wall of the first gas flow path component.

In any of the aspects or combinations of the aspects, the sensor body may sealably engage the opening in the wall of the first gas flow path component.

In any of the aspects or combinations of the aspects, the first gas flow path component may be an air flow path component.

In any of the aspects or combinations of the aspects, the first gas flow path component may be a valve assembly of the intake system or the exhaust system.

In any of the aspects or combinations of the aspects, the valve assembly may be a control valve of an exhaust gas recirculation (EGR) loop.

In any of the aspects or combinations of the aspects, the first gas flow path component may be an exhaust gas recirculation (EGR) valve and the second gas flow path component may be an exhaust gas recirculation (EGR) cooler.

In any of the aspects or combinations of the aspects, the sensor body may be coupled directly to a housing of an exhaust gas recirculation (EGR) valve.

In any of the aspects or combinations of the aspects, the first pressure port may extend into the opening in the wall of an exhaust gas recirculation (EGR) valve and the second pressure port is coupled to a flow path in an EGR cooler.

In any of the aspects or combinations of the aspects, assembling the differential pressure sensor with the first gas flow path component may include attaching a housing of the differential pressure sensor to a housing of the gas flow path component.

In any of the aspects or combinations of the aspects, assembling the differential pressure sensor with the first gas flow path component may include inserting a first pressure port through an opening of the first gas flow path component.

In any of the aspects or combinations of the aspects, assembling the first sub-assembly with the engine may include attaching a second pressure port in the differential pressure sensor to a second gas flow path component.

In any of the aspects or combinations of the aspects, assembling the first sub-assembly with the engine may include connecting the differential pressure sensor to a controller.

In any of the aspects or combinations of the aspects, the second gas flow path component may be an exhaust gas recirculation (EGR) cooler.

In any of the aspects or combinations of the aspects, the first gas flow path component may be an exhaust gas recirculation (EGR) valve.

In any of the aspects or combinations of the aspects, the EGR valve may be positioned upstream of a compressor.

In any of the aspects or combinations of the aspects, the first pressure port may extend into the EGR valve upstream of a flow adjustment mechanism.

Note that the example control and estimation routines included herein can be used with various engine, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other types of engines (V-6, I-4, I-6, V-12, opposed 4, etc.), vehicle systems, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The invention claimed is:

1. A pressure measurement apparatus for an engine, the pressure measurement apparatus comprising:
a first gas flow path component of one of an intake system or an exhaust system;
a differential pressure sensor having a sensor body defining a first pressure port and a second pressure port, wherein the sensor body is configured to cooperate with an opening in a wall of the first gas flow path component so that the first pressure port terminates inside the first gas flow path component and the second pressure port terminates outside of the first gas flow path component in an assembled configuration; and
a duct configured to connect the second pressure port to a second gas flow path component of the intake system or the exhaust system.

2. The pressure measurement apparatus of claim 1, wherein the sensor body is configured to mount directly onto the first gas flow path component.

3. The pressure measurement apparatus of claim 1, wherein the sensor body extends at least partially through the opening in the wall of the first gas flow path component.

4. The pressure measurement apparatus of claim 1, wherein the sensor body sealably engages the opening in the wall of the first gas flow path component.

5. The pressure measurement apparatus of claim 1, wherein the first gas flow path component is an air flow path component.

6. The pressure measurement apparatus of claim 1, wherein the first gas flow path component is a valve assembly of the intake system or the exhaust system.

7. The pressure measurement apparatus of claim 6, wherein the valve assembly is a control valve of an exhaust gas recirculation (EGR) loop.

8. The pressure measurement apparatus of claim 1, where the first gas flow path component is an EGR valve and the second gas flow path component is an EGR cooler.

9. The pressure measurement apparatus of claim 1, where the sensor body is coupled directly to a housing of an EGR valve.

10. A differential pressure sensor for an intake system or an exhaust system of an engine, the differential pressure sensor comprising:
   a sensor body including a first pressure port and a second pressure port, wherein the first pressure port is configured to engage with an opening in a wall of a gas flow path component of the intake system or the exhaust system so that the first pressure port terminates inside the gas flow path component and the second pressure port terminates outside of the gas flow path component in an assembled configuration.

11. The differential pressure sensor of claim 10, wherein the first pressure port extends into the opening in the wall of an exhaust gas recirculation (EGR) valve and the second pressure port is coupled to a flow path in an EGR cooler.

* * * * *